(12) United States Patent
Bzducha et al.

(10) Patent No.: US 10,364,351 B2
(45) Date of Patent: Jul. 30, 2019

(54) PROCESS FOR THE MANUFACTURE OF TANKS HAVING HIGH BARRIER PROPERTIES TOWARD FLUIDS

(75) Inventors: Wojciech Bzducha, Courbevoie (FR); Franco Speroni, Ceriano Laghetto (IT); Christophe Lapierre, Jonage (FR)

(73) Assignee: RHODIA OPERATIONS, Aubervilliers (FR)

(*) Notice: Subject to any disclaimer, the term of this patent is extended or adjusted under 35 U.S.C. 154(b) by 407 days.

(21) Appl. No.: 14/009,898

(22) PCT Filed: Apr. 10, 2012

(86) PCT No.: PCT/EP2012/056446
§ 371 (c)(1),
(2), (4) Date: Oct. 4, 2013

(87) PCT Pub. No.: WO2012/140010
PCT Pub. Date: Oct. 18, 2012

(65) Prior Publication Data
US 2014/0023808 A1  Jan. 23, 2014

(30) Foreign Application Priority Data
Apr. 11, 2011 (FR) ...................................... 11 53118

(51) Int. Cl.
| | |
|---|---|
| B60K 15/03 | (2006.01) |
| C08L 77/02 | (2006.01) |
| B29C 45/00 | (2006.01) |
| B29D 22/00 | (2006.01) |
| C08L 77/06 | (2006.01) |
| B29K 77/00 | (2006.01) |
| B29L 31/00 | (2006.01) |

(52) U.S. Cl.
CPC .......... C08L 77/02 (2013.01); B29C 45/0001 (2013.01); B29C 45/006 (2013.01); B29D 22/003 (2013.01); B60K 15/03 (2013.01); C08L 77/06 (2013.01); B29K 2077/00 (2013.01); B29L 2031/7172 (2013.01); B60K 15/03177 (2013.01); Y10T 29/49826 (2015.01); Y10T 428/1352 (2015.01)

(58) Field of Classification Search
CPC .. B29C 65/00; C08G 69/36; F17C 2203/0604
See application file for complete search history.

(56) References Cited

U.S. PATENT DOCUMENTS

| | | | | |
|---|---|---|---|---|
| 4,987,185 A | * | 1/1991 | Aoki | C08L 25/08 525/179 |
| 6,075,116 A | | 6/2000 | Moriwaki et al. | |
| 6,077,904 A | * | 6/2000 | Dalgewicz, III | B29C 49/0005 524/401 |
| 6,160,080 A | | 12/2000 | Cucinella et al. | |
| 6,525,166 B1 | | 2/2003 | Di Silvestro et al. | |
| 6,867,256 B1 | | 3/2005 | Di Silvestro et al. | |
| 2005/0133509 A1 | | 6/2005 | Nagakura et al. | |
| 2006/0116475 A1 | | 6/2006 | Leibler et al. | |
| 2006/0189747 A1 | | 8/2006 | Joachimi et al. | |
| 2009/0203845 A1 | | 8/2009 | Fukui et al. | |
| 2010/0151173 A1 | | 6/2010 | Peduto | |
| 2011/0000127 A1 | | 1/2011 | Liu et al. | |
| 2012/0088873 A1 | * | 4/2012 | Vergelati | C08L 77/00 524/169 |
| 2012/0123041 A1 | | 5/2012 | Zaher et al. | |

FOREIGN PATENT DOCUMENTS

| | | |
|---|---|---|
| JP | H11-21448 A | 1/1999 |
| JP | 2005-193650 A | 7/2005 |
| JP | 2006-515381 A | 5/2006 |
| JP | 2008-501836 A | 1/2008 |
| JP | 2010-189637 A | 9/2010 |
| WO | 9724388 A1 | 7/1997 |
| WO | 9903909 A1 | 1/1999 |
| WO | 9964496 A1 | 12/1999 |
| WO | 2004104102 A1 | 12/2004 |
| WO | 2008135401 A1 | 11/2008 |
| WO | WO 2010115951 A1 * 10/2010 | .............. C08L 77/00 |
| WO | 2010142605 A1 | 12/2010 |

OTHER PUBLICATIONS

Standard ISO 11443, "Plastics—Determination of the Fluidity of Plastics Using Capillary and Slit-Die Rheometers—Second edition", 2005, 34 pp.
Standard ISO 179/1, "Plastics—Determination of Charpy impact properties—Part 1: Non-instrumented impact test—Second Edition", 2010, 22 pp.
Directive 2000/8/CE of the European Parliament and of the Council of Mar. 20, 2000 amending Council Directive 701221/EEC on the approximation of the laws of the Member States relating to "liquid fuel tanks and rear underrun protection of motor vehicles and their trailers", Mar. 20, 2000, 14 pp.
Dijkstra D.J., "Guidelines for rheological characterization of polyamide melts", Pure Applied Chem, 2009, vol. 81, No. 2, p. 339-349—XP002664879—IUPAC.

* cited by examiner

*Primary Examiner* — Scott W Dodds
(74) *Attorney, Agent, or Firm* — Osha Liang LLP

(57) ABSTRACT

The invention relates to a method for producing a tank having high fluid-barrier properties. According to the invention, a specific polyamide composition containing impact-resistance modifying agents is used in a first step to produce components by means of injection moulding and, subsequently, said components are assembled in order to obtain the tank. The viscosity and gasoline permeability of the polyamide composition are sufficient to allow the production of tanks that provide an excellent trade-off between fluid-barrier properties and mechanical properties.

16 Claims, No Drawings

PROCESS FOR THE MANUFACTURE OF TANKS HAVING HIGH BARRIER PROPERTIES TOWARD FLUIDS

RELATED APPLICATIONS

This application is a U.S. national stage entry under 35 U.S.C. § 371 of International Application No. PCT/EP2012/056446, filed Apr. 10, 2012, which claims priority to French Application No. 1153118 filed on Apr. 11, 2011. The entire contents of these applications are explicitly incorporated herein by this reference.

The present invention relates to a process for the manufacture of a tank having high barrier properties toward fluids, in which a specific polyamide composition comprising agents modifying the impact strength is used in the manufacture of components by injection molding in a first stage and subsequently an assembling of these components in order to obtain said tank. The polyamide composition exhibits an appropriate and sufficient viscosity and permeability to gasoline which makes possible the manufacture of tanks having an excellent compromise between the barrier properties toward fluids and the mechanical properties.

PRIOR ART

Industrial polyamides are used in the preparation of numerous articles in various fields, such as the motor vehicle field, where specific properties of stiffness, impact strength, dimensional stability, in particular at relatively high temperatures, surface appearance, density and weight are particularly desired. The choice of a material for a given application is generally guided by the level of performance required with regard to certain properties and by its cost. Indeed, novel materials capable of meeting requirements in terms of performance and/or costs are always sought after.

It is known in the prior art to use polyamide materials in the manufacture, by extrusion-blow molding, of single- or multilayer articles intended to contain or transport a fluid, such as, for example, tubes, pipes or tanks However, it is often necessary to carry out improvements in these materials in order to confer on them satisfactory barrier properties toward gases or fluids.

For example, it is known to use multilayer tubes or tanks, in particular having from two to six layers; it being possible for each layer to be composed of different materials in order to confer, on the assembly, the barrier and mechanical properties required according to the applications. However, such multilayer articles are expensive to produce and problems of delaminations can occur between the incompatible materials of the different layers.

It is also known to use plastic matrices, in particular polyamide or polyolefin matrices, with lamellar nanofillers in order to reduce the permeability. Such a decrease in permeability is attributed to a "tortuosity" effect caused by these nanofillers. The lamellar nanofillers which have been the most investigated today are smectite clays, mainly montmorillonite. However, it is difficult to use these products insofar as it is necessary to exfoliate them in the matrix, in particular by using intercalation agents, in order to obtain individual lamellae with high shape factors.

Another route used to reduce the permeation of plastic matrices is the surface treatment by thin layers of materials having very low permeability. These deposition processes can take place by chemical deposition, such as the fluorination of HDPE tanks, vacuum deposition of aluminum, or plasma deposition, or else by the physical route, such as, for example, wet deposition, such as the deposition of PVdC emulsions on films for packaging, or on blown bottles.

Furthermore, the extrusion-blow molding process is restricting, in particular in the production of articles having complex geometries and structures, and comprising inserts.

Thus, to date, the prior art has provided complex solutions, which are difficult to implement and expensive, in order to enhance the barrier properties of plastic materials; moreover, often in view of the other properties of the plastic materials, such as in particular the mechanical and processability properties. It is thus desirable to develop articles having high barrier properties toward fluids which make it possible to obtain effective levels of impermeability, while avoiding the abovementioned disadvantages, in particular without using the extrusion-blow molding process.

INVENTION

The applicant company has just demonstrated that it is perfectly possible to produce tanks exhibiting high barrier properties toward fluids by injection molding using a specific and high-performance polyamide composition, comprising impact modifiers, in the preparation of components of these tanks. It is thus apparent that these polyamide formulations exhibit satisfactory rheological properties and good mechanical properties while having good barrier properties toward fluids, in particular fuels. These tanks, thus obtained by injection molding, are easy to obtain with short cycle times while avoiding the constraints of the extrusion-blow molding process.

The present invention thus relates to a process for the manufacture of a tank having high barrier properties toward fluids, comprising at least the following stages:

a) manufacture of one or more components by injection molding a polyamide composition; and b) assembling the component or components obtained in stage a), optionally with one or more other components, in order to obtain the tank;

said polyamide composition comprising from 5% to 40% by weight of agent which modifies the impact strength and exhibiting the following characteristics:
  a melt viscosity of between 50 and 700 Pa·s, measured according to the standard ISO 11443, at a shear gradient of $1000\ s^{-1}$ and a temperature equal to the melting point of the polyamide +35° C.; and
  a permeability to gasoline SP95 E10 of less than or equal to 10 g·mm/m$^2$·day, measured at a temperature of 40° C. and a relative humidity of 20%, in particular, the polyamide composition is devoid of cyclodextrin and of silica ($SiO_2$). Very particularly, the composition is devoid of binding fillers.

The composition advantageously comprises:
  at least 20% by weight, with respect to the total weight of agent which modifies the impact strength, of an agent which modifies the impact strength comprising functional groups which react with the polyamide, and/or
  at least 10% by weight, with respect to the total weight of agent which modifies the impact strength, of a compatibilizing agent comprising functional groups which react with the polyamide.

Very particularly, the process can result in a tank, the wall of which exhibits a notched Charpy impact at 40° C. (KJ/m$^2$), ISO 179-1/1 eA, of greater than or equal to 23 kJ/m$^2$, in particular of greater than or equal to 25 kJ/m$^2$, indeed even of greater than or equal to 27 kJ/m$^2$. In particular, these results are obtained without reinforcing fillers.

"Tank" is understood to mean, according to the invention, an article intended to receive, store and/or deliver a fluid, in particular fuel of a motor vehicle or of a heavier-than-air craft.

"Materials or articles having high barrier properties toward fluids" is understood to mean an object which exhibits a reduced permeability with regard to a fluid. According to the present invention, the fluid can be a gas or a liquid. Mention may in particular be made, as gas, of oxygen, carbon dioxide, hydrogen, helium, nitrogen, light hydrocarbons, such as methane, ethane, propane, ethylene and propylene, and water vapor. Mention may be made, as liquids, of nonpolar solvents, in particular solvents representative of gasolines, such as toluene or isooctane, and/or polar solvents, such as water and alcohols, for example methanol or ethanol, refrigerants, such as ethylene glycol, and mixtures of nonpolar solvents, of polar solvents and of nonpolar/polar solvents, such as, for example, alcohol-blend gasolines, such as gasolines of E10 and E85 type. I1 should be noted that the liquids can exhibit variable viscosities, such as in particular high viscosity liquids related to gels or creams.

The composition according to the invention can exhibit a melt viscosity of between 100 and 500 Pa·s at a temperature T=M.p.+35° C. In order to measure this viscosity, the melting point of the polyamide can be determined by differential scanning calorimetry (DSC) using a Perkin Elmer Pyris 1 device and a rate of 10° C./min. The M.p. is thus calculated by the device with respect to the corresponding temperature at the top of the melting peak.

In particular, the composition exhibits a melt viscosity of greater than or equal to 150 Pa·s, very particularly ranging from 200 to 500 Pa·s, indeed even from 250 to 450 Pa·s.

The process according to the invention can make it possible to prepare, by injection, tanks having a large capacity, in particular of at least 10 liters and especially of 10 to 25 liters. Very particularly, these can exhibit a low wall thickness, in particular a low mean wall thickness, especially of less than 4 mm, very particularly ranging from 1 to 3 mm, indeed even ranging from 1 to 2 mm, and more particularly still of approximately 1.5 mm.

Very particularly, the process can result in tanks, the walls of which meet the impact Trial test as defined by Directive 2000/8/EC, for a thickness of 3 mm, indeed even of 1.5 mm, in particular with a notched Charpy impact at −40° C. (kJ/m$^2$), ISO 179-1/1 eA, of greater than or equal to 30 kJ/m$^2$.

The process according to the invention can also make it possible to obtain tanks, in particular tanks having complex shapes, having a very precise wall thickness, in particular of less than 3 mm, in particular of approximately 2 mm, indeed even of approximately 1.5 mm. In particular, at least 95%, especially at least 98%, indeed even at least 99% and very particularly 100% of the surface of the external walls, and optionally internal walls, of the tank exhibit a thickness of less than or equal to 4 mm, in particular of less than or equal to 3 mm, very particularly of less than or equal to 2 mm, indeed even of approximately 1.5 mm.

The process according to the invention can also make it possible, simply and conveniently, to insert different components into the tank, such as the main components of the fuel system, for example structural sections, additional anti-slosh baffles, making possible a reduction in the noise and/or an improvement in the structural integrity of the tank.

The composition according to the invention preferably exhibits a permeability to gasoline SP95 E10 of less than or equal to 7 g·mm/m$^2$·day, more preferably of less than or equal to 4 g·mm/m$^2$·day.

This permeability is measured in particular according to the following protocol: plaques with dimensions of 100×100×0.8 mm are obtained by injection molding a polyamide composition on a Demag 80 t device with a screw diameter of 25 mm; for example, for PA 6.6: Tbarrel =275° C., Tmold=80° C., cycle time 25 s. The plaques are dried overnight at 80° C. under vacuum. One of the faces of the plaque is subsequently placed in contact with the gasoline SP95 E10, comprising 10% by volume of ethanol, 45% of isooctane and 45% of toluene, using an aluminum permeation dish with a volume of 25 cm$^3$ 75% filled with gasoline, the dish/plaque combination being hermetically sealed. The dishes are subsequently placed in an oven at 40° C. with a relative humidity of 20%. The weight of the combination (dish+plaque+gasoline) is measured over time. During a first period, "induction period", no loss in weight is detected and this makes it possible to confirm the leaktightness of the system. The loss in weight detected is multiplied by the thickness of the polymer plaque, which is 0.8 mm in the test configuration chosen, and divided by the polymer/gasoline exchange surface area, defined by the design of the permeation dish. A disk with a surface area of 0.001256 m$^2$ in the chosen test configuration. By deriving, with respect to time, this standardized loss in weight, an instantaneous permeability value, expressed in g·mm/m$^2$·d, is obtained. The instantaneous permeability is zero during the induction period and then it gradually increases up to a value at equilibrium which corresponds to the permeability value under continuous operating conditions. This permeability value under continuous operating conditions is regarded as being the permeability of the material. The permeability values given later are mean values obtained from at least three tests.

The polyamide of the invention is chosen in particular from the group consisting of the polyamides obtained by polycondensation of at least one aliphatic dicarboxylic acid with one aliphatic or cyclic or cycloaliphatic or arylaliphatic diamine, such as PA 6.6, PA 6.10, PA 6.12, PA 10.10, PA 10.6, PA 12.12, PA 4.6, MXD 6 or PA 9.2, or between at least one aromatic dicarboxylic acid and one aliphatic or aromatic diamine, such as polyterephthalamides or polyisophthalamides, or their blends and (co)polyamides, such as PA 6.6/6.T, PA 9/T, PA 6.6/4.T, PA 10/T, PA 6.T/6.I, PA 6.6/6.1, and the like. The polyamide of the invention can also be chosen from the polyamides obtained by polycondensation of at least one amino acid or lactam with itself, it being possible for the amino acid to be generated by the hydrolytic opening of a lactam ring, such as, for example, PA 6, PA 7, PA 11, PA 12, PA 13 or their blends and (co)polyamides. Mention may in particular be made of polyamide 6/6.6 as type of copolyamide.

Preference is given in particular to semicrystalline aliphatic or semiaromatic polyamides.

Polyamides of type 6 and polyamides of type 6.6 are particularly preferred. Polyamide of type 6 is understood to mean in particular a polyamide comprising at least 90% by weight of caprolactam or aminocaproic monomer residues. Polyamide of type 6.6 is understood in particular to mean a polyamide comprising at least 90% by weight of adipic acid and hexamethylenediamine monomer residues.

Use may in particular be made of polyamides of variable molecular weights by addition, before or during the polymerization of the polyamide monomers, or else in melt extrusion, of monomers which modify the length of the chains, such as, in particular, difunctional and/or monofunctional compounds exhibiting amine or carboxylic acid or anhydride or epoxy functional groups capable of reacting with the monomers of the polyamide or the polyamide.

Carboxylic acid is understood to mean carboxylic acids and their derivatives, such as acid anhydrides, acid chlorides and esters, for example. Amine is understood to mean amines and their derivatives capable of forming an amide bond.

It is possible to use, at the start of, during or at the end of the polymerization, any type of aliphatic or aromatic monocarboxylic or dicarboxylic acid or any type of aliphatic or aromatic monoamine or diamine amine Use may very particularly be made of a polyamide obtained at least from adipic acid and hexamethylenediamine or from their salts, such as hexamethylenediamine adipate, which can optionally comprise various proportions of other polyamide monomers. To this end, mention may be made of polyamide 6.6/6.T.

Polyamides according to the invention can also be obtained by blending, in particular melt blending. It is possible, for example, to blend a polyamide with another polyamide, or a polyamide with a polyamide oligomer, or else a polyamide with monomers which modify the length of the chains, such as, in particular, diamines, dicarboxylic acids, monoamines and/or monocarboxylic acids. It is possible, in particular, to add isophthalic acid, terephthalic acid or benzoic acid to the polyamide, for example at contents of approximately 0.2% to 2% by weight.

The composition of the invention can also comprise copolyamides derived in particular from the above polyamides, or blends of these polyamides or (co)polyamides.

Use may also be made of branched polyamides, in particular obtained by blending, during polymerization, in the presence of the polyamide monomers, at least one multifunctional compound comprising at least 3 identical or different reactive functional groups of amine functional group or carboxylic acid functional group type.

Use may also be made, as polyamide of high melt flow, of a star polyamide comprising star macromolecular chains and, if appropriate, linear macromolecular chains. Polymers comprising such star macromolecular chains are, for example, described in the documents WO97/24388 and WO99/64496.

These star polyamides are in particular obtained by blending in polymerization, in the presence of the polyamide monomers, an amino acid or lactam, such as caprolactam, at least one multifunctional compound comprising at least 3 identical reactive functional groups of amine functional group or carboxylic acid functional group type. Carboxylic acid is understood to mean carboxylic acids and their derivatives, such as acid anhydrides, acid chlorides and esters, for example. Amine is understood to mean amines and their derivatives capable of forming an amide bond.

Use may also be made of copolyamides with a structure of the random tree type which are described in particular in the application WO99/03909.

The composition according to the invention preferably comprises at least one semicrystalline aliphatic or semiaromatic polyamide having a melting point (M.p.) such that 170° C.≤M.p.≤300° C., preferably 210° C.≤M.p.≤285° C., which can be a homopolymer, a copolymer, a linear or branched, or star, polyamide, or a blend of polyamides.

The composition can comprise, in addition to the modified polyamide of the invention, one or more other polymers, preferably polyamides or copolyamides.

The composition according to the invention can comprise between 20% and 90% by weight, preferably between 20% and 80% by weight, of polyamide, with respect to the total weight of the composition.

The composition can also comprise, depending on the desired final property, a blend of modified polyamide according to the invention and one or more other polymers, such as, for example, polyamide, polyester, polyolefins, polystyrene, ABS resin, polycarbonate, polyphenylene sulfide (PPS), polyphenylene ether (PPE), polyacetal, polysulfone, polyethersulfone, polyetherimide, polyetherketone, a polylactic acid resin, a polysulfone resin, an elastomeric resin or blends of these.

The composition can comprise reinforcing or bulking fillers, such as, for example, fibrous fillers and/or nonfibrous fillers.

Mention may be made, as fibrous fillers, of glass fibers, carbon fibers, natural fibers, aramid fibers and nanotubes, in particular carbon nanotubes. Mention may be made, as natural fibers, of hemp and flax. Mention may in particular be made, among nonfibrous fillers, of all particulate or lamellar fillers and/or exfoliable or nonexfoliable nanofillers, such as alumina, carbon black, aluminosilicate clays, montmorillonites, zirconium phosphate, kaolin, calcium carbonate, diatomaceous earths, graphite, mica, silica, titanium dioxide, zeolites, talc, wollastonite, polymeric fillers, such as, for example, dimethacrylate particles, glass beads or glass powder.

It is perfectly possible according to the invention for the composition to comprise several types of reinforcing fillers. Preferably, the most widely used filler can be glass fibers, of the "chopped" type, in particular having a diameter of between 7 and 14 µm. These fillers can exhibit a surface sizing which ensures the mechanical adhesion between the fibers and the polyamide matrix.

The concentration by weight of the reinforcing or bulking fillers can be between 1% and 60% by weight, preferably between 15% and 50% by weight, with respect to the total weight of the composition.

According to an alternative form, the composition is devoid of reinforcing fillers and/or of bulking fillers.

The composition according to the invention can additionally comprise additives conventionally used in the manufacture of polyamide compositions. Thus, mention may be made of lubricants, flame retardants, plasticizers, nucleating agents, impact modifiers, catalysts, light and/or heat stabilizers, antioxidants, antistats, colorants, mattifying agents, molding aids or other conventional additives.

The composition can comprise a content of agent which modifies the impact strength comprising functional groups which react with the polyamide of greater than or equal to 50% by weight, in particular of greater than or equal to 75% by weight, indeed even of greater than or equal to 80% by weight, with respect to the total weight of agent which modifies the impact strength. According to a specific embodiment, the composition comprises a content of impact modifier comprising functional groups which react with the polyamide of greater than or equal to 90% by weight, in particular of greater than or equal to 95% by weight, indeed even 100% by weight, with respect to the total weight of impact modifiers. Advantageously, 100% of the agent which modifies the impact strength is an agent which modifies the impact strength comprising functional groups which react with the polyamide.

The composition can comprise a content of compatibilizing agent carrying functional groups which react with the polyamide of greater than or equal to 15% by weight, in particular of greater than or equal to 20% by weight, indeed even of greater than or equal to 25% by weight, with respect to the total weight of agent which modifies the impact strength. This alternative form can in particular be carried out when the agent which modifies the impact strength is devoid of functional groups which react with the polyamide.

Said reactive groups can make it possible to ensure good dispersing of the impact modifiers in the polyamide matrix. There is generally obtained an impact strength in the event of good dispersing with impact modifier particles having a mean size of between 0.1 and 1 µm in the matrix. This can make it possible to obtain compositions exhibiting advantageous characteristics, in particular in terms of compromise in mechanical properties, rheological properties and barrier properties.

Mention may be made, among the reactive groups, of the maleic anhydride or glycidyl groups, acids, esters, in particular (meth)acrylic esters and the polymers of these, and the mixtures of these groups.

The agents which modify the impact strength according to the invention can be elastomeric polymers which can be used for this purpose. The agents which modify the toughness are generally defined as having an ASTM D-638 tensile modulus of less than approximately 500 MPa. Examples of suitable elastomers are ethylene/acrylic ester/maleic anhydrides, ethylene/propylene/maleic anhydrides or EPDMs (ethylene/propylene/diene monomers) with optionally a grafted maleic anhydride, and ionomers.

The composition preferably comprises from 10% to 35% by weight, in particular from 10% to 30% by weight and more preferably from 20% to 25% by weight of agents which modify the impact strength, with respect to the total weight of the composition.

Preference is given in particular to the impact modifiers comprising functional groups which react with the polyamide. Mention may be made, for example, of terpolymers of ethylene, acrylic ester and glycidyl methacrylate, copolymers of ethylene and butyl ester acrylate, copolymers of ethylene, n-butyl acrylate and glycidyl methacrylate, copolymers of ethylene and maleic anhydride, styrene/maleimide copolymers grafted with maleic anhydride, styrene/ethylene/butylene/styrene copolymers modified with maleic anhydride, styrene/acrylonitrile copolymers grafted with maleic anhydride, acrylonitrile/butadiene/styrene copolymers grafted with maleic anhydride, and their hydrogenated versions.

These fillers and additives can be added to the modified polyamide by normal means suited to each filler or additive, such as, for example, during the polymerization or in melt blending.

The polyamide composition can optionally comprise a novolac resin. Novolac resins are generally condensation products of phenolic compounds with aldehydes or ketones. These condensation reactions are generally catalyzed by an acid or a base.

The term "novolac resin" is generally understood to mean a phenolic resin for which the formaldehyde/phenol ratio is less than 1 and which, for this reason, normally remains thermoplastic until it has been heated with an appropriate amount of a compound, for example formaldehyde or hexamethylenetetramine, capable of giving additional bonds and consequently of giving an infusible product.

The polyamide according to the invention can comprise one or more different types of novolac resin.

The novolac resins generally exhibit a degree of condensation of between 2 and 15.

The phenolic compounds can be chosen, alone or as mixtures, from phenol, cresol, xylenol, naphthol, alkylphenols, such as butylphenol, tert-butylphenol or isooctylphenol, nitrophenol, phenylphenol, resorcinol or bisphenol A; or any other substituted phenol.

The aldehyde most frequently used is formaldehyde. However, use may be made of other aldehydes, such as acetaldehyde, paraformaldehyde, butyraldehyde, crotonaldehyde, glyoxal and furfural. Use may be made, as ketone, of acetone, methyl ethyl ketone or acetophenone. The aldehyde and/or the ketone can optionally carry another functional group, such as, for example, a carboxylic acid functional group. To this end, mention may in particular be made of glyoxylic acid or levulinic acid.

According to a specific embodiment of the invention, the novolac resin is a condensation product of phenol and formaldehyde.

The novolac resins used advantageously have a molecular weight of between 500 and 3000 g/mol, preferably between 800 and 2000 g/mol.

Mention may in particular be made, as commercial novolac resin, of the commercial products Durez®, Vulkadur® or Rhenosin®.

In particular, when the composition comprises a content of agent which modifies the impact strength, in particular of polyolefin type, of greater than or equal to 25% by weight, with respect to the total weight of the composition, it can be of use for it to also comprise novolac, in particular in a content ranging from 1% to 7% by weight, especially from 4% to 6% by weight, indeed even of approximately 5% by weight, with respect to the total weight of the composition.

The ratio by weight of the impact modifier, in particular of polyolefin type, to the novolac can range from 4 to 10, in particular from 5 to 9, indeed even be approximately 6.

The presence of novolac can in particular make it possible to obtain a particularly advantageous compromise in mechanical properties.

The materials and compositions of the invention are generally obtained by blending the various constituents under hot conditions, for example in a single- or twin-screw extruder, at a temperature sufficient to keep the polyamide resin as a molten medium, or under cold conditions, in a mechanical mixer in particular. Generally, the blend obtained is extruded in the form of rods which are cut into pieces in order to form granules. The compounds can be added at any point in the process for the manufacture of the plastic, in particular by hot or cold blending with the plastic matrix. The addition of the compounds and additives can be carried out by addition of these compounds to the molten plastic matrix in the pure form or in the form of a concentrated mixture in a matrix, such as, for example, a plastic matrix.

According to the process of the invention, stage a) consists of the manufacture of one or more components by injection molding the polyamide composition according to the invention. These components are produced by any conventional injection molding process well known in the field. The components can in particular be half-shells or articles having more complex geometries which, once assembled, will make it possible to manufacture the tank. The components can be concave or convex parts, for example.

In stage b) of the process of the invention, the component or components manufactured in stage a) are assembled, optionally with one or more other components, in order to manufacture the tank. The other components can be metal or plastic or other parts, such as, for example, inserts. These other components can be obtained by various types of process, in particular by injection molding for plastic components The tank can be composed solely of components obtained in stage a). "Assembling components" is understood to mean bringing the components into contact, over at least a portion of their respective surfaces, and rendering integral at the contact surface. The components can be brought into contact over flat portions of their surfaces or over curved portions. The parts of the components brought into contact can have conjugate shapes.

This assembling can be carried out directly or indirectly. Mention is made, as direct assembling, of welding, fitting in, hooping and insertion, in particular. Mention is made, as indirect assembling, of adhesive bonding, stapling, the use of screws and bolts or the recess. This assembling can be permanent or else can be dismantled without significant damage to the parts or components, such as, for example, by the use of screws, rivets, nails, soldering joints, staples or others.

The direct or indirect welding of the components is preferred in particular. Preferably, the surfaces brought into contact interact to form a continuous welding line or a continuous welding surface. After having been brought into contact, the surfaces are, for example, brought to a temperature at least greater than the softening temperature of the materials making up the elements, preferably in the vicinity of the melting point. Mention may be made, as known welding techniques suitable for the invention, by way of example, of: ultrasonic welding, according to which the surfaces are brought to the desired temperature by ultrasound; vibration welding, according to which the surfaces are brought into contact and into vibration with respect to one another, the friction between the surfaces thus bringing about the heating and the softening of the material; hot-plate welding, using a heated plate is positioned between the welding surfaces and is then removed when the latter have reached the desired temperature: the surfaces are then brought in contact under a predetermined pressure; infrared welding, which is a technique similar to that of hot-plate welding, the heat source being an emitter of infrared radiation; hot-air welding and laser welding.

The assembling in stage b) is preferably carried out by bringing the components into contact over at least a portion of their surfaces and then welding the components over at least a portion where the components are in contact, at a temperature greater than the softening temperature of the materials forming the components.

Thus, the process can comprise a stage of formation of the shell of the tank, in particular representing at least 90% of the surface of the final tank, in particular as two half-shells, the addition of modules and/or devices inside one or both half-shells and assembling the two half-shells, in particular by welding. This process can thus make it possible to avoid a stage of cutting from the shell, in order to make possible assemblings, as is generally done in the case of blow molding.

The present invention also relates to a tank comprising an assembly of components, at least one of the components of which is obtained by injection molding the polyamide composition according to the invention.

The articles obtained defined as tanks can in particular be containers, vessels, casings, open or closed receptacles or derivatives.

A specific language is used in the description so as to facilitate understanding of the principle of the invention. Nevertheless, it should be understood that no limitation on the scope of the invention is envisaged by the use of this specific language. Modifications, improvements and refinements can in particular be envisaged by a person conversant with the technical field concerned on the basis of his own general knowledge.

The term and/or includes the meanings and, or and all the other possible combinations of the elements connected to this term.

Other details or advantages of the invention will become more clearly apparent in the light of the examples given below purely by way of indication.

EXPERIMENTAL PART

The compounds used are as follows:
Polyamide 6.6 of linear type, having a VI of 150 ml/g (determined in 90% formic acid according to the standard ISO 307) and a melting point (M.p.) of 265° C.
Polyamide 6.6 of linear type, having a VI of 175 ml/g (determined in 90% formic acid according to the standard ISO 307) and a melting point (M.p.) of 265° C.
Polyamide 6.6 of linear type, having a VI of 310 ml/g (determined in 90% formic acid according to the standard ISO 307), obtained by the PCS process, and a melting point (M.p.) of 265° C.
Polyamide 6.6 of branched type obtained according to the application WO2010142605 using 0.38 mol % of BHT (BisHexamethyleneTriamine) and 99.62 mol % of N salt (1:1 salt of hexamethylenediamine and adipic acid). The polyamide exhibits a viscosity index of 150 ml/g (determined in formic acid according to the PN-EN ISO 307 method) and a melting point (M.p.) of 262° C.
Copolyamide 6.6/6 (90/10% by weight), having a VI of 165 ml/g (determined in 90% formic acid according to the standard ISO 307) and a melting point (M.p.) of 240° C.
Polyamide 6 of random tree type obtained according to the application WO99/03909 using 0.185 mol % of 5-aminoisophthalic acid and 99.8 mol % of ε-caprolactam. The polyamide exhibits a viscosity index of 200 to 225 ml/g (determined in formic acid according to the PN-EN ISO 307 method) and a melting point (M.p.) of 217° C.
Linear polyamide 6.10 obtained using the 1:1 molar salt of hexamethylenediamine and sebacic acid. The polyamide exhibits a viscosity index of 135 ml/g (determined in formic acid according to the PN-EN ISO 307 method) and a melting point (M.p.) of 215° C.
Copolyamide 6.6/6.T of molar ratio 65/35 having a melting point equal to 283° C., synthesized from 35 mol % of 6.T salt (1:1 salt of hexamethylenediamine and terephthalic acid) and 65 mol % of N salt (1:1 salt of hexamethylenediamine and adipic acid) and from acetic acid added as chain-limiting agent (71 meq/kg in the final polymer), according to a process of synthesis analogous to that for a PA 6.6 but with a finishing temperature of 290° C. The concentrations of amine end groups AEGs and of carboxylic acid end groups CEGs are determined by potentiometric assay. AEG=85 meq/kg, CEG=52 meq/kg. The number-average molar mass, determined from the expression Mn=2 000 000/(concentration of end groups), is 9600 g/mol.
Impact modifiers: Exxelor VA1801, Exxelor VA1803 and Bondyram 7103 (olefinic copolymers grafted with maleic anhydride).

Chain extender: Araldite GT7071
Phenolic resin of Novolac S type
Additives: EBS wax, masterbatch of 50% carbon black in polyethylene and masterbatch of 40% nigrosine in PA 6, and also heat stabilizers in the form of masterbatches.

The melting points of the polyamides are determined by differential scanning calorimetry (DSC), using a Perkin Elmer Pyris 1 device, at a rate of 10° C./min.

Before extrusion, the polyamides are dried to a water content lower than their water content at equilibrium. Formulations are prepared by melt blending the various components and additives in a Werner & Pfleiderer ZSK 40 corotating twin-screw extruder with venting (L/D=36), operating at 30-40 kg/h and at a speed of 270 rev/min. The extrusion temperatures with an increasing profile are 250-280° C. The motor torque and the motor power absorbed vary according to the polyamides. All the components of the formulation are introduced at the beginning of the extruder.

The compositions of the formulations are combined in tables 1 and 2. The are expressed by weight, with respect to the total weight of the composition. The formulations comprise 4% of a mixture of colorants, stabilizers and lubricants.

The mechanical properties, the permeability to the fuel SP95 E10 and the melt viscosities of these formulations are combined in the tables.

The impact strength (notched Charpy impact) properties were determined according to the standard ISO 179-1/1 eA with "multifunction" injection-molded test specimens with a thickness of 4 mm.

The melt viscosities are measured according to the standard ISO11443 using a Göttfert 2002 capillary rheometer. The measurement is carried out on samples having an equilibrium water content. A piston, moving at programmed speeds, pushes the molten polymer through a capillary having a length L (30 mm) and a diameter D (1 mm). The corresponding flow rate is measured, from which the apparent viscosity can be deduced. A shear gradient sweep from $5000\ s^{-1}$ to $25\ s^{-1}$ is performed. A rheological profile is thus produced which makes it possible to define the behavior of the material over a whole shear gradient range representative of the injection-molding process. The viscosity is measured at a shear gradient of $1000\ s^{-1}$ and a temperature equal to the melting point of the polyamide +35° C.

The analysis of the permeability toward gasolines is carried out according to the following procedure: plaques with dimensions of 100×100×0.8 mm are obtained by injection molding a polyamide composition on a Demag 80 t device with a screw diameter of 25 mm; for example, for PA 6.6: Tbarrel=275° C., Tmold=80° C., cycle time 25 s. The plaques are dried overnight at 80° C. under vacuum. One of the faces of the plaque is subsequently placed in contact with the gasoline SP95 E10, comprising 10% by volume of ethanol, 45% of isooctane and 45% of toluene, using an aluminum permeation dish with a volume of 25 $cm^3$ 75% filled with gasoline, the dish/plaque combination being hermetically sealed. The dishes are subsequently placed in an oven at 40° C. with a relative humidity of 20%. The weight of the combination (dish+plaque+gasoline) is measured over time. During a first period, "induction period", no loss in weight is detected and this makes it possible to confirm the leaktightness of the system. The loss in weight detected is multiplied by the thickness of the polymer plaque, which is 0.8 mm in the test configuration chosen, and divided by the polymer/gasoline vapors exchange surface area, defined by the design of the permeation dish. A disk with a surface area of 0.001256 $m^2$ in the chosen test configuration. By deriving, with respect to time, this standardized loss in weight, an instantaneous permeability value, expressed in $g \cdot mm/m^2 \cdot d$, is obtained. The instantaneous permeability is zero during the induction period and then it gradually increases up to a value at equilibrium which corresponds to the permeability value under continuous operating conditions. This permeability value under continuous operating conditions is regarded as being the permeability of the material. The permeability values given later are mean values obtained from at least three tests.

TABLE 1

| EXAMPLES | C1 | C2 | 1 | 2 | 3 | 4 |
|---|---|---|---|---|---|---|
| Linear PA 6.6 (VI = 150 ml/g) | | | 65.5 | | | |
| Linear PA 6.6 (VI = 175 ml/g) | 96 | | | 71 | | |
| Linear PA 6.6 (VI = 320 ml/g) | | | | | | 71 |
| PA 6.10 (VI = 135 ml/g) | | 96 | | | | |
| PA 6.6/6.T | | | | | | 71 |
| Elastomer Exxelor VA1801 | | | 25 | 25 | 25 | 25 |
| Phenolic resin of Novolac S type | | | 5 | | | |
| Araldite GT7071 | | | 0.5 | | | |
| E10 Permeability (g · mm/$m^2$ · day) | 1.3 | 7.3 | 1.7 | 3.7 | 3.6 | 1.0 |
| Viscosity (Pa · s) | 150 | 145 | 270 | 300 | 280 | 270 |
| Notched Charpy impact at 23° C. (kJ/$m^2$), ISO 179-1/leA | 5 | 6 | 103 | 99 | 89 | 97 |
| Notched Charpy impact at −40° C. (kJ/$m^2$), ISO 179-1/leA | 4 | 4 | 24 | 28 | 34 | 28 |

TABLE 2

| EXAMPLES | 5 | 6 | 7 | 8 | 9 | 10 |
|---|---|---|---|---|---|---|
| Branched PA 6.6 (VI = 150 ml/g) | 71 | | | | | |
| PA 6.6/6 (VI = 165 ml/g) | | 66 | | | | |
| Tree PA 6 (VI = 210 ml/g) | | | 61 | 80 | 75 | 66 |
| Elastomer Exxelor VA1801 | 25 | 25 | | | | |
| Elastomer Exxelor VA1803 | | | 30 | | | |
| Elastomer Bondyram 7103 | | | | 15 | 20 | 25 |
| Phenolic resin of Novolac S type | | 5 | 5 | | | 5 |
| Araldite GT7071 | | | | 1 | 1 | |
| E10 Permeability (g · mm/$m^2$ · day) | 3.6 | 3.2 | 4.4 | 3.9 | 5.4 | 4.6 |
| Viscosity (Pa · s) | 390 | 340 | 360 | 270 | 350 | 410 |
| Notched Charpy impact at 23° C. (kJ/$m^2$), ISO 179-1/leA | 93 | 102 | 119 | 82 | 108 | 109 |
| Notched Charpy impact at −40° C. (kJ/$m^2$), ISO 179-1/leA | 23 | 24 | 111 | 17 | 29 | 31 |

It is thus apparent that the use of a composition according to the present invention makes possible the manufacture of a fuel tank exhibiting an excellent compromise in mechanical, rheological and barrier properties.

The invention claimed is:

1. A process for making a tank having high barrier properties toward fluids, comprising:
   assembling one or more components made by injection molding of a polyamide composition, optionally with one or more other components, in order to obtain the tank; said polyamide composition comprising a polyamide and from 5% to 40% by weight of an impact strength modifier, wherein the impact strength modifier has a mean particle size of between 0.1 and 1 µm and is defined as having an ASTM D-638 tensile modulus of less than about 500 MPa;

said polyamide composition further comprising a novolac resin; and said polyamide composition exhibiting the following characteristics:

a melt viscosity of between 50 and 700 Pa·s, measured according to the standard ISO 11443, at a shear gradient of 1000 s$^{-1}$ and a temperature equal to the melting point of the polyamide +35° C.; and a permeability to SP95 E10 alcohol-blend gasoline of less than or equal to 10 g·mm/m$^2$·day, as measured at a temperature of 40° C. and a relative humidity of 20%, wherein:

the polyamide composition is devoid of cyclodextrin and silica;

the polyamide composition is substantially free of plasticizers;

the impact strength modifier comprises at least 20% by weight, based on the total weight of the impact strength modifier, of reactive impact strength modifier that comprises functional groups that are reactive with the polyamide, and/or the polyamide composition further comprises at least 10% by weight, based on the total weight of the impact strength modifier, of a compatibilizing agent that comprises functional groups that are reactive with the polyamide.

2. The process of claim 1, wherein the composition exhibits a melt viscosity of between 100 and 500 Pa·s.

3. The process of claim 1, wherein the composition exhibits a permeability to SP95 E10 alcohol-blend gasoline of less than or equal to 4 g·mm/m$^2$·day.

4. The process of claim 1, wherein the polyamide is a semicrystalline aliphatic or semiaromatic polyamide.

5. The process of claim 1, wherein the polyamide composition comprises between 20% and 90% by weight of the polyamide, with respect to the total weight of the polyamide composition.

6. The process of claim 1, wherein the other components are metal or plastic parts.

7. The process of claim 1, wherein the step of assembling is carried out by direct or indirect welding.

8. The process of claim 1, wherein the tank is composed solely of components obtained by injection molding of the polyamide composition.

9. The process of claim 1, wherein the step of assembling is carried out by bringing the components into contact over at least a portion of their surfaces and then welding the components over at least a portion where the components are in contact, at a temperature greater than the softening.

10. The process of claim 1, wherein the tank comprises a wall that exhibits a notched Charpy impact at −40° C. (kJ/m$^2$), measured according to the standard ISO 179-1/1 eA, of greater than or equal to 23 kJ/m$^2$.

11. The process of claim 10, wherein the wall exhibits a thickness of less than 4 mm.

12. The process of claim 10, wherein the wall exhibits a thickness of from 1.5 mm to 3 mm.

13. The process of claim 1, wherein the polyamide composition further comprises the impact strength modifier and/or compatibilizing agent, wherein the impact strength modifier and/or compatibilizing agent comprise one or more reactive functional groups selected from a group consisting of maleic anhydride, glycidyl groups, (meth)acrylic ester groups, and mixtures thereof.

14. The process as of claim 1, wherein the composition comprises greater than or equal to 25% by weight of the impact strength modifier, with respect to the total weight of the composition, and further comprises from 1% to 7% by weight of the novolac resin, with respect to the total weight of the composition.

15. The process of claim 1, wherein the impact strength modifier is added within a range of 4 to 10 times that of the novolac resin.

16. The process of claim 1, wherein the polyamide composition is free of plasticizers.

* * * * *